3,323,989
METHOD FOR COMBATING INSECTS WITH 5-FORMAMIDO - 1 - NAPHTHYL N - METHYLCARBAMATE
Linwood K. Payne, Jr., Charleston, W. Va., assignor to Union Carbide Corporation, a corporation of New York
No Drawing. Filed Dec. 30, 1964, Ser. No. 422,414
2 Claims. (Cl. 167—32)

This invention relates to a new and useful insecticidal carbamate. More particularly, this invention is concerned with 5-formamido-1-naphthyl N-methylcarbamate, insecticidal compositions containing said carbamate, and methods of using said carbamate to combat insects.

The carbamate of this invention can be represented by the following formula:

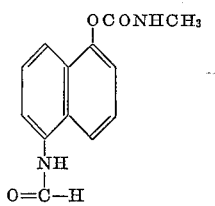

The 5-lower acylamino-1-naphthyl N-methylcarbamates such as 5-acetamidonaphthyl N-methylcarbamate are known (U.S. Patent No. 3,099,681). These latter carbamates are useful as insecticides. In addition, 1-naphthyl N - methylcarbamate is known (U.S. Patent No. 2,903,478). This latter carbamate is also useful as an insecticide.

It has now been found, quite unexpectedly, that the carbamate of this invention, 5-formamido-1-naphthyl N-methylcarbamate, is far more active as an insecticide than either 5-acetamidonaphthyl N-methylcarbamate, or 1-naphthyl N-methylcarbamate. It has been specifically shown by clear and convincing evidence that 5-formamido-1-naphthyl N-methylcarbamate has substantially greater effectiveness against the insects Mexican bean beetle and the housefly than either 5-acetamidonaphthyl N-methylcarbamate, or 1-naphthyl N-methylcarbamate. This superior activity was unpredictable and entirely unexpected.

The 5-formamido-1-naphthyl N-methylcarbamate of this invention can be prepared by the reaction of 5-formamido-1-naphthol with methyl isocyanate, as represented by the following schematic equation:

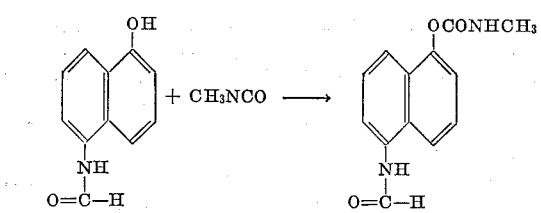

This reaction is conducted by reacting the 5-formamido-1-naphthol with methyl isocyanate in the presence of an anhydrous, inert solvent and a catalyst in a pressure vessel under autogenous pressure and at from about ambient temperatures to about 200° C. The solvent is distilled off from the reaction mixture, leaving as a residue the 5-formamido-1-naphthyl N-methylcarbamate. The catalyst can be an organo-metallic compound such as dibutyltin diacetate or an organic tertiary amine such as pyridine, or triethylamine. Applicable reaction solvents are ethyl ether, benzene, dioxene, dimethylformamide, and the like. The 5-formamido-1-naphthyl N-methylcarbamate can be recrystallized from solvents such as xylene, petroleum ether, benzene, methanol, and mixtures thereof.

PREPARATION 1

*5-formamido-1-naphthol*

5-amino-1-naphthol (31.8 g.; 0.2 mole) was stirred and heated at 108° C. with 100 ml. of 88 percent formic acid for one and one-half hours. The resulting reaction mixture was cooled and diluted with 300 ml. of water. A solid precipitated which was collected by filtration. The solid was washed thoroughly with water, then isopropyl alcohol and finally with ethyl ether. After drying, the 5-formamido-1-naphthol weighed 30 g. (80 percent yield) and melted at 218–223° C.

A sample was treated with decolorizing charcoal and recrystallized from dilute aqueous isopropanol (1:1); M.P. 221–223° C.

*Analysis.*—Calc'd for $C_{11}H_9NO_2$: C, 70.6, 70.7; H, 4.8, 5.0; N, 7.5, 7.5.

Infrared: $3.05\mu$ (N—H); $3.10\mu$ (bonded O—H); $6.10\mu$ (C=O); $6.47\mu$ (N—H); $7.89\mu$ (aromatic C—O) and $12.78\mu$ (1,2,3-tri-substituted aromatic ring).

EXAMPLE 1

*5-formamido-1-naphthyl N-methylcarbamate*

5-formamido-1-naphthyl (9.4 g.; 0.05 mole) dissolved in 75 ml. of dimethylformamide was treated with 3.1 g. (0.055 mole) of methyl isocyanate and two drops of triethylamine catalyst. The reaction mixture was allowed to stand for sixteen hours in a sealed pyrex pressure bottle. The solvent was evaporated from the product under reduced pressure and the residue added to 50 ml. of benzene. The resulting solid was collected by filtration and washed thoroughly with benzene. After drying, the weight was seven grams (57 percent yield). An analytical sample was obtained by recrystallization from xylene; M.P. 189–191° C.

*Analysis.*—Calc'd. for $C_{13}H_{12}N_2O_3$: C, 63.9, 64.1; H, 5.0, 5.3; N, 11.5, 11.5.

Infrared: $3.0\mu$ (N—H); $5.8\mu$ (carbamate C=O); $5.95\mu$ (amide C=O); $6.48\mu$ and $6.55\mu$ (amide and carbamate N—H) and $7.95\mu$ (C—O).

As disclosed herein 5-formamido-1-naphthyl N-methylcarbamate is useful as an insecticide. It is particularly effective as an insecticide against Mexican bean beetles and houseflies, as is evidenced by the following comparative tests shown in Table I.

TABLE I.—COMPARATIVE INSECTICIDAL EFFECTIVENESS OF SEVERAL CARBAMATES

| Name | Structure | Insects | |
|---|---|---|---|
| | | Mexican Bean Beetle | Housefly |
| | | Results [$LD_{50}$ (p.p.m.)] | |
| 5-formamido-1-naphthyl N-methylcarbamate | 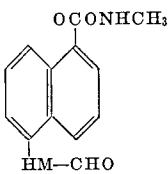 | 6 | 35 |
| 5-acetamidonaphthyl N-methylcarbamate | 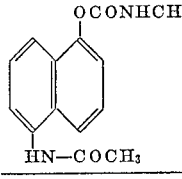 | 10 | 120 |
| 1-naphthyl N-methylcarbamate | 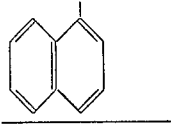 | 8 | [1] 250 |
| 4-formamido-1-naphthyl N-methylcarbamate | 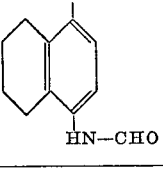 | 50 | 60 |

[1] Broken curve; little or no increased kill after 70 percent mortality with increased dosage.

With reference to Table I, a stock formulation of each of the carbamates tested, was prepared by mixing 100 milligrams of the compound with 10 milliliters of acetone and 10 milligram of a dimeric alkylated aryl polyether alcohol commercially sold as to wetting agent. This mixture was then diluted with water to give 100 milliliters of the standard insecticidal solution. Lower, graded, test concentrations were prepared by diluting the standard stock solution with water to give the desired concentration. The solutions, containing various concentrations in a dilution series, were then tested on Mexican bean beetle larvae and house flies. Percent mortality of the test insects was plotted against the toxicant concentration on logarithmic probability paper. The concentration in milligrams of toxicant per 100 milliliters of solution needed for 50 percent mortality ($LD_{50}$ value) is interpolated from a line drawn through the points so plotted.

It can be seen from Table I that 5-formamido-1-naphthyl N-methylcarbamate is more active against both Mexican bean beetle and the housefly than either of the other three-carbamates tested. Particularly with regard to the housefly, 5-formamido-1-naphthyl N-methylcarbamate is far superior to either 1-(5-acetamidonaphthyl)-N-methylcarbamate, 1-naphthyl N-methylcarbamate or 4-formamido-1-naphthyl N-methylcarbamate. From a practical standpoint the latter three compounds are ineffective against the housefly and their use in combatting the housefly would not be practical.

The test results recorded in Table I were conducted as follows:

MEXICAN BEAN BEETLE SPRAY TEST

*Test organism.*—Fourth instar larvae of the Mexican bean beetle (*Epilachina varivestis*, Muls.) reared on Tendergreen beans in a room where temperature is maintained at 80±5° F. and relative humidity 50±5 percent.

*Application of toxicant.*—Potted Tendergreen bean plants of standard height and age are placed on a revolving turntable. A formulated water mixture of the chemical (100–110 ml.) is applied to the plants by use of a De Vilbiss spray gun with air pressure set at 40 pounds. Application of this volume of formulated compound takes 25 seconds. This volume of spray is sufficient to wet the plants to run-off. An equivalent amount of a water solution containing acetone and emulsifier in the same concentrations as the insecticidal mixture but without the candidate insecticide is sprayed on other plants as checks or controls for the experiment. When dry, paired leaves are separated and each is placed in a 9-cm. Petri dish lined with filter paper. Four randomly selected larvae are introduced before closing the dish.

*Concentration of toxicant.*—The test compounds are formulated by a standard procedure of solution in acetone, addition of an emulsifier, and dilution with water. Primary screening tests are run at 100 p.p.m.

*Holding conditions.*—The closed dishes are held at 80±5° F., for 3 days. Although the larvae can easily consume the whole leaf within 24–48 hours, no more food is added. Check larvae remain vigorous during the entire holding period and do not advance to the quiescent pre-pupal state. The holding time cannot be reduced to less than 3 days without sacrificing ease of reading the percentage mortality.

*Indicative response.*—Larvae which are unable to move the length of the body, even upon stimulation, are considered dead. Possible repellent qualities of the test compounds are recorded as percentage inhibition of feeding. While not excluding the possibility of contact insecticidal action, this test will indicate chemicals which display repellent or stomach poison effects in the absence of contact toxicity. Each compound is rated according to the following rating designation:

5=excellent control
3=fair control
1=poor-control

Compounds receiving a rating of "5" (80–100 percent mortality) pass to secondary screening. In secondary testing the concentration of the toxicant is lowered in a dilution series in order to determine $LD_{50}$ noted in Table I.

FLY BAIT TEST

*Test Organism.*—Four to six day old adult house flies (*Musca domestica*, L.) reared according to the specifications of the Chemical Specialties Manufacturing Association, [Blue Book, (MacNair-Dorland Company, New York) pp. 243–244, 261, 1954] under controlled conditions of 80±5° F. and 50±5 percent relative humidity. The adult flies are immobilized by anesthetizing with $CO_2$. Twenty-five immobilized individuals (males and females) are then transferred to a cage consisting of a standard food strainer approximately 5 inches in diameter which is then inverted over the blotting paper containing the bait cup.

*Application of Toxicant.*—A 10 ml. volume of the test formulation containing 1,000 p.p.m. of chemical in 10 percent sugar water is added to a souffle cup containing a one-inch square pad of asborbent cotton. The cup containing the bait is centered on a sheet of white blotting paper measuring 6 by 6 inches and offered to the flies.

*Concentration of Toxicant.*—The test compounds are formulated by a standard procedure of solution in acetone, addition of an emulsifier, and dilution with a 10 percent sugar solution. Primary screening tests are run at 1,000 p.p.m.

*Holding Conditions.*—The caged flies are allowed to feed on the bait for a period of 24 hours. Room temperature and humidity are 80±5° F. and 50±5 percent relative humidity respectively.

*Indicative Response.*—Flies which show no sign of movement upon stimulation are considered dead. Each compound is rated according to the following designations:

5=excellent control
3=fair control
1=poor control

Compounds receiving a rating of "5" (80–100 percent mortality) pass to secondary testing. In secondary testing the concentration of the toxicant is lowered in a dilution series in order to determine $LD_{50}$ noted in Table I.

The compound of the instant invention can be applied to plants or other areas to be protected by contacting such area with the instant compound in an undiluted form, as a dust when admixed with finely powdered inert carriers, or in a liquid form. The rate of application can vary from about 0.25 to about 10 pounds of the compound per acre with a rate of from about 0.5 to about 2 pounds per acre preferred.

When the compound of the instant invention is applied as a dust it can be mixed with suitable particulate extenders, such as clay, chalk, talc, diatomaceous earth, pyrophyllite, infusorial earth, fuller's earth, pumice, bentonite, and flours, such as cotton seed flour and walnut shell flour.

The application of the instant compound in a liquid medium can be accomplished in any of several ways. For example, the compound can be directly dispersed in a liquid carrier such as water, petroleum distillates, and the like with or without the use of surface active agents.

Another method of preparation of liquid compositions containing the compound of this invention is to first prepare a liquid concentrate, containing the compound, by dissolving the compound in a solvent such as acetone, toluene, xylene or other suitable solvent. This liquid concentrate can then be added to water together with suitable surface active dispersing agents whereby the compound is dispersed in the water.

A third method of preparing liquid compositions containing the compound of this invention is to prepare a wettable powder by dispersing the compound on or in a finely divided inert solid such as clay, talc, chalk, bentonite, fuller's earth and the like. These compositions may also contain dispersing or wetting agents as desired. These compositions can then be mixed with water to provide a liquid insecticide suitable for application to the areas to be treated.

The surface active agents that can be employed in the above-described compositions can be any of the known anionic, cationic and non-ionic wetting, emulsifying and dispersing agents, such as aralkyl polyether alcohols, aralkyl polyether sulfonates, aralkyl polyether sulfates, quaternary ammonium compounds, and the like. When these surface active agents are employed they generally comprise from about 0.5 percent to about 5 percent by weight of the total composition.

The 5-formamido-1-naphthyl N-methylcarbamate of this invention can advantageously be used in combination with other insecticides, such as 1-naphthyl N-methylcarbamate, to provide insecticidal compositions having a broader spectrum of activity than the individual compound used alone. For example, test results have shown 5-formamido-1-naphthyl N-methylcarbamate to give an $LD_{50}$ only at greater than 100 parts per million against the bean aphid whereas 1-naphthyl N-methylcarbamate gives an $LD_{50}$ at only 20 parts per million against the same organism under the same test conditions. From the results of this latter test and the housefly results shown in Table I, it can be seen that an insecticidal composition containing as the essential active ingredients 5-formamido-1-naphthyl N-methylcarbamate and 1-naphthyl N-methylcarbamate would provide an insecticidal composition possessing greater activity over a wider range. The amount of 5-formamido-1-naphthyl N-methylcarbamate and 1-naphthyl N-methylcarbamate to be used in the insecticidal composition can, of course, vary with the circumstances and the insect to be combatted. In general, a ratio of from about 1:10 to about 10:1 is suitable, with a ratio of from about 2:1 to about 1:2 preferred. Of course, such a composition can be formulated as disclosed hereinabove together with diluents, surface-active agents, carriers, and the like. In addition to combinations of 5-formamido-1-naphthyl N-methylcarbamate and 1-naphthyl N-methylcarbamate, other combinations are suitable such as combinations of 5-formamido-1-naphthyl N-methylcarbamate and dichlorodiphenyltrichloroethane (DDT); within the aforementioned general ratios. DDT has been shown to have an $LD_{50}$ of 1000 parts per million against the Mexican bean beetle whereas as shown in Table I, 5-formamido-1-naphthyl N-methylcarbamate has an $LD_{50}$ of 6 parts per million. Addition of 5-formamido-1-naphthyl N-methylcarbamate to DDT would provide a combination having a broadened spectrum of pest control.

What is claimed is:

1. A method for combating insects which comprises exposing said insects to an insecticidal amount of 5-formamido-1-naphthyl N-methylcarbamate.

2. A method for combating Mexican bean bettles and house flies which comprises exposing said Mexican bean beetles and house flies to an insecticidal amount of 5-formamido-1-naphthyl N-methylcarbamate.

References Cited

UNITED STATES PATENTS

| 2,903,478 | 9/1959 | Lambrech | 167—32 |
| 3,037,993 | 6/1962 | Shulgin | 71—2.6 |
| 3,099,681 | 7/1963 | Kilsheimer | 167—32 |
| 3,197,364 | 7/1965 | Kilsheimer | 167—32 |

ALBERT T. MEYERS, *Primary Examiner.*

JEROME D. GOLDBERG, *Assistant Examiner.*